(12) United States Patent
Lin

(10) Patent No.: US 8,471,133 B1
(45) Date of Patent: Jun. 25, 2013

(54) QUICK-RELEASE CYMBAL FELT LOCATING DEVICE

(75) Inventor: Yi Hsien Lin, Taoyuan County (TW)

(73) Assignee: K.H.S. Musical Instrument Co., Ltd., New Taipei (TW)

( * ) Notice: Subject to any disclaimer, the term of this patent is extended or adjusted under 35 U.S.C. 154(b) by 0 days.

(21) Appl. No.: 13/419,885

(22) Filed: Mar. 14, 2012

(30) Foreign Application Priority Data

Jan. 6, 2012 (TW) .............................. 101200317 A

(51) Int. Cl.
*G10D 13/02* (2006.01)
(52) U.S. Cl.
USPC .......................................................... 84/421
(58) Field of Classification Search
USPC .......................................................... 84/421
See application file for complete search history.

(56) References Cited

U.S. PATENT DOCUMENTS

| | | | | |
|---|---|---|---|---|
| 3,336,827 A * | 8/1967 | Gaylor | ........................ | 84/422.3 |
| 3,705,528 A * | 12/1972 | Cordes | ........................ | 84/421 |
| 3,994,198 A * | 11/1976 | Herman | ........................ | 84/421 |
| 4,319,514 A * | 3/1982 | Donohoe | ........................ | 84/421 |
| 4,365,535 A * | 12/1982 | Buttner et al. | ........................ | 84/421 |
| 4,928,567 A * | 5/1990 | Kurosaki | ........................ | 84/422.3 |
| 4,960,028 A * | 10/1990 | Ramirez | ........................ | 84/421 |
| 5,438,903 A * | 8/1995 | Cropek | ........................ | 84/422.3 |
| 5,668,332 A * | 9/1997 | Lombardi | ........................ | 84/422.3 |
| 6,057,500 A * | 5/2000 | Liao | ........................ | 84/422.3 |
| 6,177,621 B1 * | 1/2001 | Hoshino | ........................ | 84/422.3 |
| 6,930,233 B2 * | 8/2005 | Hsieh | ........................ | 84/422.3 |
| 7,176,368 B2 * | 2/2007 | Takegawa | ........................ | 84/422.3 |
| 7,479,593 B1 * | 1/2009 | Townsend | ........................ | 84/421 |
| 8,330,031 B2 * | 12/2012 | Taninbaum | ........................ | 84/418 |

OTHER PUBLICATIONS

Tama QC8 Quick Set Cymbal Mate Quick Release Wingnut, Ebay viewed Mar. 20, 2013 at http://www.ebay.com/itm/Tama-QC8-Quick-Set-Cymbal-Mate-Quick-Release-Wingnut-/300777070244.*
Excerpt photo of videa on YouTube, Tama Cymbal Mate (QC8), posted Jul. 31, 2010, viewedf Mar. 20, 2013 at http://www.youtube.com/watch?v=OJ6z2IPsyxw.*

* cited by examiner

*Primary Examiner* — David Warren
*Assistant Examiner* — Robert W Horn
(74) *Attorney, Agent, or Firm* — Rabin & Berdo, P.C.

(57) ABSTRACT

A quick-release cymbal felt locating device includes a base internally defining a cavity having a front opening, and provided with a first insert hole vertically extended through the cavity and a second insert hole horizontally extended through the cavity; a movable clamping element extending into the cavity via the front opening thereof, and provided with a first communicating hole corresponding to the first insert hole and a second communicating hole corresponding to the second insert hole; and a safety pin transversely extended through the second insert hole and the second communicating hole for restricting or allowing displacement of the movable clamping element relative to the safety pin and the cavity. The first communicating hole and the first insert hole together form a clamping mechanism, with which a user can quickly assemble or disassemble the quick-release cymbal felt locating device to or from a cymbal pole.

10 Claims, 8 Drawing Sheets

QUICK-RELEASE CYMBAL FELT LOCATING DEVICE

FIELD OF THE INVENTION

The present invention relates to a quick-release cymbal felt locating device, and more particularly to a quick-release cymbal felt locating device that includes a clamping mechanism for quickly assembling to or disassembling from a cymbal pole.

BACKGROUND OF THE INVENTION

A conventional cymbal stand includes a pole erected thereon. Two shock-suppressing felt washers are extended through by an upper end of the pole for clamping a cymbal between the two felt washers. A cymbal fastening screw is screwed into the pole to hold the two felt washers in place, so that the two felt washers are pressed against an upper and a lower side of the cymbal to hold the latter in place. The above arrangement allows a user to strike the cymbal to produce sound. However, whenever it is necessary to disassemble the cymbal from the pole of the conventional cymbal stand, the user has to loosen the cymbal fastening screw before the cymbal can be removed from the pole. Therefore, a lot of time and efforts are spent to assemble or disassemble the cymbal and the felt washers to or from the pole. Further, since the cymbal fastening screw is turned to tighten to or loosen from the pole, it is easily subjected to wearing and tends to undesirably separate from the pole after it has been tightened or loosened many times. It is therefore necessary to work out a way to improve the conventional cymbal fastening screw.

SUMMARY OF THE INVENTION

A primary object of the present invention is to provide a quick-release cymbal felt locating device that includes a clamping mechanism enabling quick assembling or disassembled of the device to or from a cymbal pole.

Another object of the present invention is to provide a quick-release cymbal felt locating device that includes a safety pin and an elastic element to ensure firm and stable connection of the device to a cymbal pole.

To achieve the above and other objects, the quick-release cymbal felt locating device according to the present invention includes a base internally defining a cavity having a front opening and a movable clamping element extending into the cavity via the front opening thereof. The base is provided with a first insert hole vertically extended through the cavity and a second insert hole horizontally extended through the cavity; and the movable clamping element is provided with a first communicating hole corresponding to the first insert hole and a second communicating hole corresponding to the second insert hole. And, a safety pin is transversely extended through the second insert hole and the second communicating hole for restricting displacement of the movable clamping element relative to the safety pin and the cavity. The first communicating hole and the first insert hole cooperate with each other to form a clamping mechanism that enables quick assembling or disassembling of the quick-release cymbal felt locating device to or from a cymbal pole.

In a preferred embodiment of the present invention, the safety pin includes a first section and a second section that are different in thickness. When the safety pin is inserted into the second insert hole and the second communicating hole with only the first section located in the second communicating hole, there is a margin space in the second communicating hole between the safety pin and the movable clamping element, allowing the movable clamping element to displace inward or outward relative to the safety pin and the cavity; and when the first section and the second section are both located in the second communicating hole, the movable clamping element is locked in place relative to the cavity.

The second insert hole has two opposite ends being separately sized corresponding to the first section and the second section; and the second communicating hole is sized corresponding to the second section. The safety pin further includes a slope section located between the first section and the second section, allowing the movable clamping element to conveniently slide from the first section to the second section via the slope section when the safety pin is displaced in the second insert hole and the second communicating hole.

In an operable embodiment, the first insert hole has an inner wall surface cooperating with an opposite inner wall surface of the first communicating hole to form a clamping mechanism. And, the first communicating hole is provided on a part of its inner wall surface with internal threads, so that the quick-release cymbal felt locating device can be engaged with external threads provided on an outer surface of the cymbal pole.

Moreover, an elastic element is axially disposed between the base and the movable clamping element for automatically elastically pushing the movable clamping element outward to press against the safety pin when the movable clamping element is not subjected to an inward push force externally applied thereto.

In a preferred embodiment, a stop mechanism is further provided between the base and the safety pin for limiting a range within which the safety pin can be displaced.

The stop mechanism includes a fixing hole formed on the base, a long sliding slot formed on the safety pin, and a stop pin. The sliding slot internally defines a first limiting end and an opposite second limiting end; and the stop pin is extended into the fixing hole and the sliding slot.

Moreover, a coupler is formed around and downward projected from a lower end of the first insert hole on the base for a piece of cymbal felt to fit therearound.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and with reference to the accompanying drawings.

Figure 1:
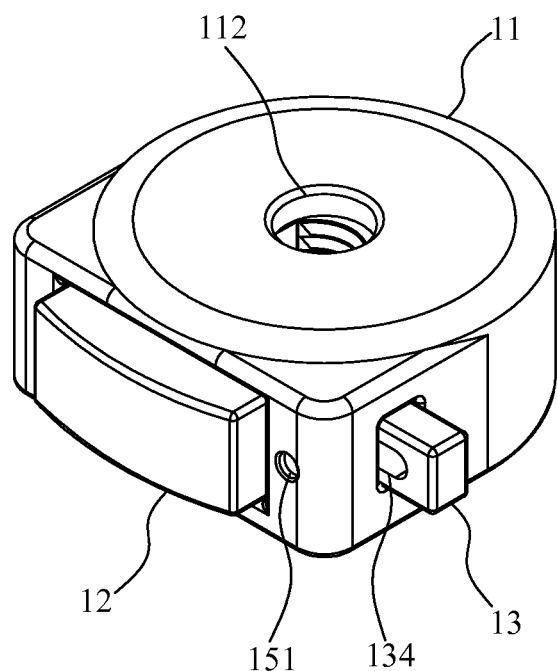
FIG. 1 is an assembled top perspective view of a quick-release cymbal felt locating device according to a preferred embodiment of the present invention.
Figure 2:
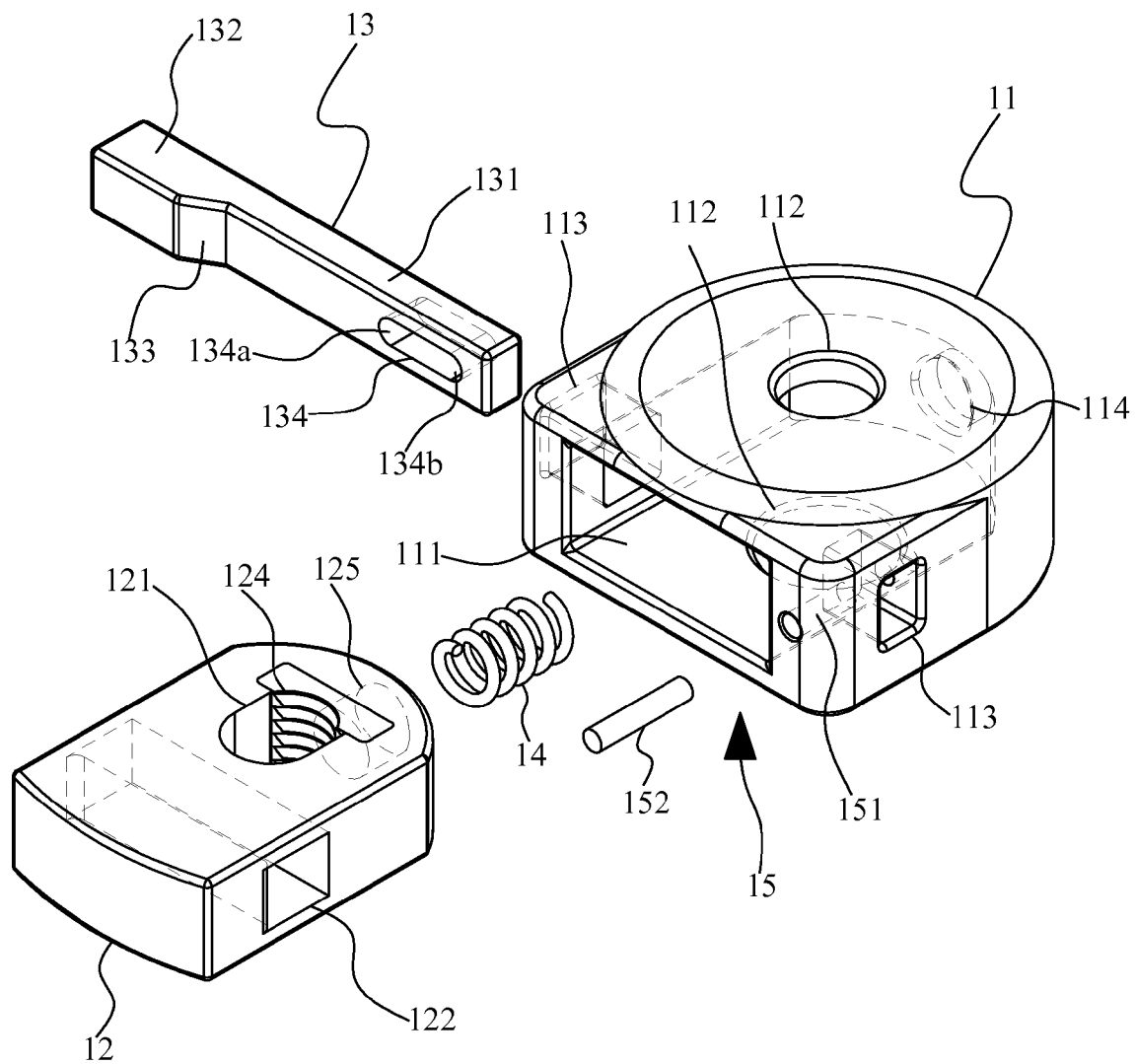
FIG. 2 is an exploded view of FIG. 1.

Please refer to FIGS. 1 and 2 that are assembled and exploded top perspective views, respectively, of a quick-release cymbal felt locating device 10 according to a preferred embodiment of the present invention. As shown, the quick-release cymbal felt locating device 10 includes a base 11 internally defining a cavity 111 having a front opening, and a movable clamping element 12 extending into the cavity 111 via the front opening thereof. The base 11 is provided with a first insert hole 112 vertically extended through the base 11 via the cavity 111, and a second insert hole 113 horizontally extended through the base 11 via the cavity 111. The movable clamping element 12 is provided with a first communicating hole 121 corresponding to the first insert hole 112, and a second communicating hole 122 corresponding to the second insert hole 113. The first communicating hole 121 cooperates with the first insert hole 112 to provide a clamping function. The quick-release cymbal felt locating device 10 further includes a safety pin 13 that transversely extends through the second insert hole 113 and the second communicating hole 122 to allow or to restrict displacement of the movable clamping element 12 relative to the safety pin 13 and the cavity 111.

Figure 3:
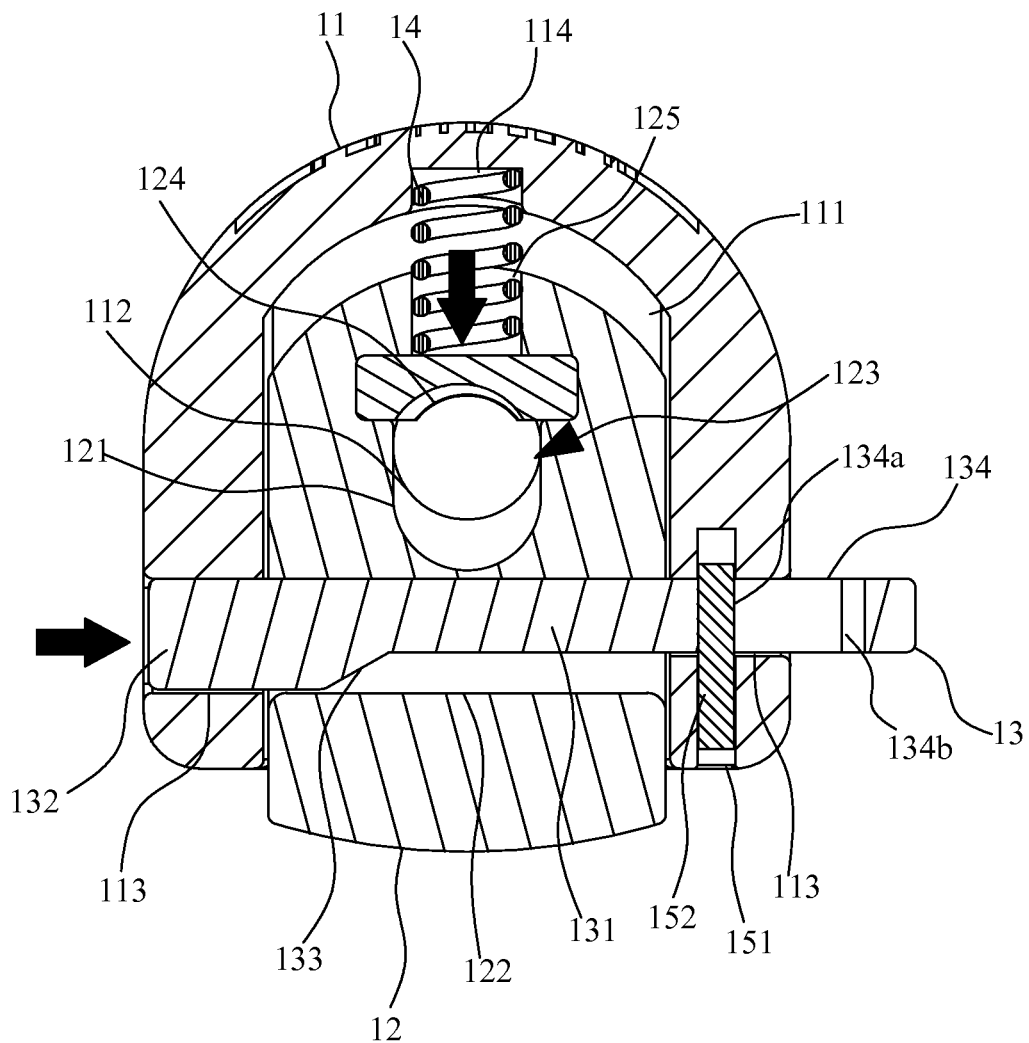
FIG. 3 is a top sectional view showing the use of the quick-release cymbal felt locating device of the present invention in a first manner.
Figure 7:
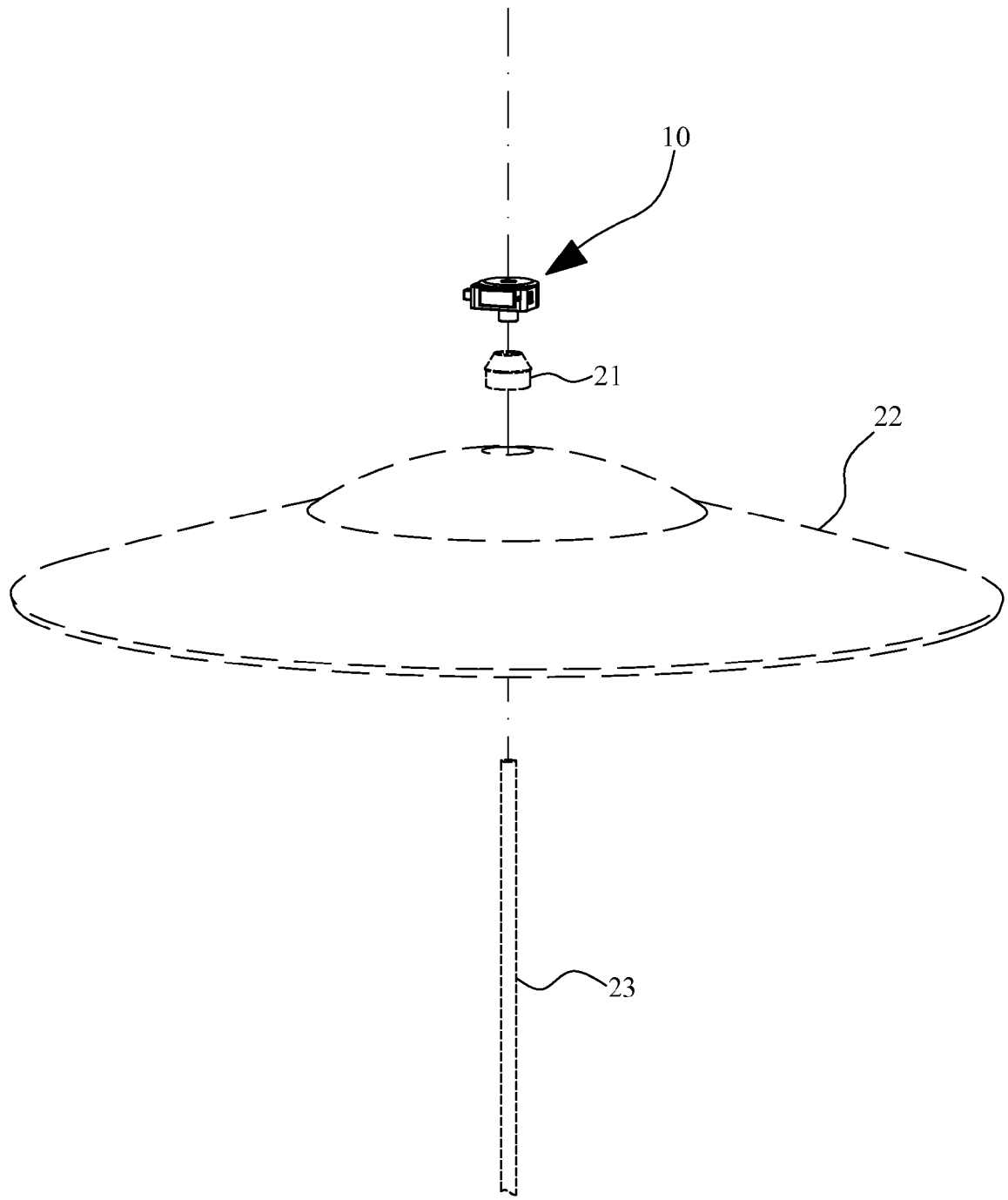
FIG. 7 is an exploded view showing the use of the present invention to connect a cymbal felt and a cymbal to a cymbal pole.

In an operable embodiment, the first insert hole 112 has an inner wall surface cooperates with an opposite inner wall surface of the first communicating hole 12 to form a clamping mechanism 123 (see FIG. 3). It is noted the first communicating hole 121 is provided on a part of its inner wall surface with internal threads 124, so that the quick-release cymbal felt locating device 10 can engage with external threads provided on an outer surface of a cymbal pole 23 (see FIGS. 7 and 8) to ensure firm and reliable clamping of the device 10 to the cymbal pole 23.

An elastic element 14 is axially provided between the base 11 and the movable clamping element 12. As can be seen from FIG. 2, the cavity 111 of the base 11 and the movable clamping element 12 are provided with a first recess 114 and a second recess 125, respectively. The elastic element 14 is disposed in between the first and the second recess 114, 125, so that the movable clamping element 12 not subjected to an inward push externally applied thereto is automatically elastically pushed outward by the elastic element 14 to press against the safety pin 13. Thus, with the elastic element 14, the clamping mechanism 123 formed by the first insert hole 112 and the first communicating hole 121 can provide further enhanced clamping effect.

Figure 4:
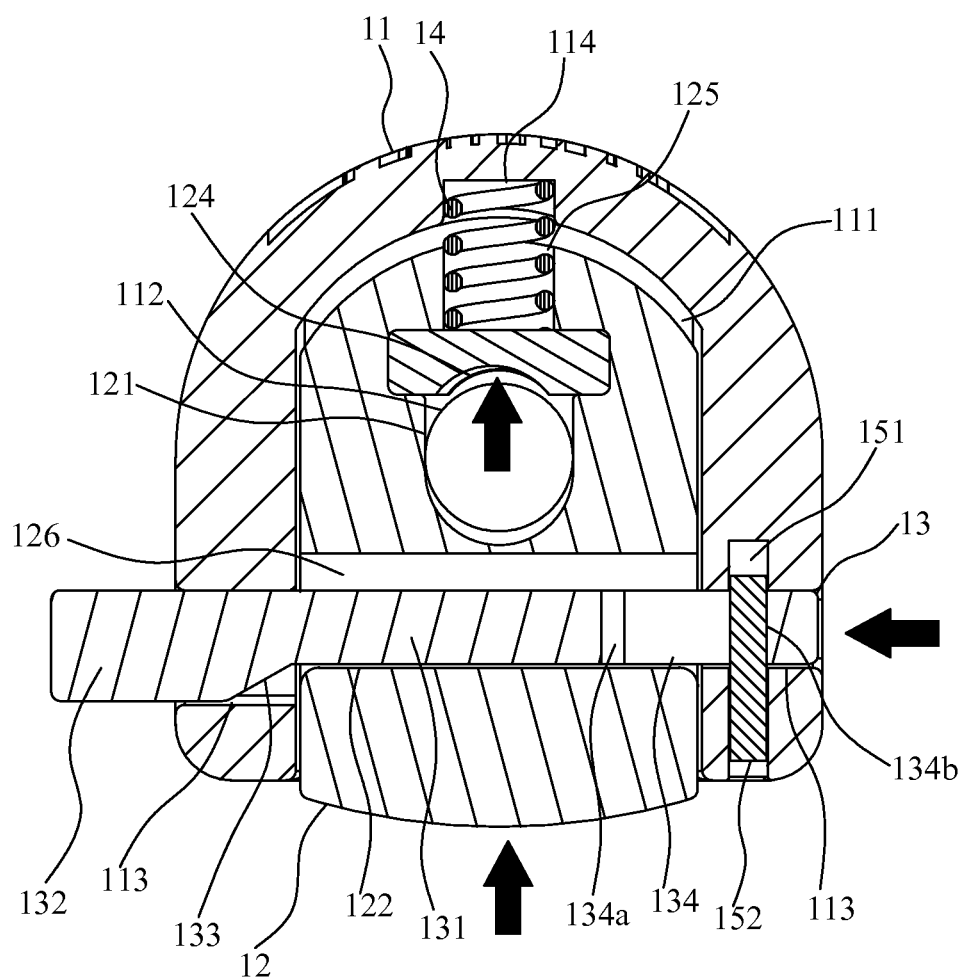
FIG. 4 is another top sectional view showing the use of the quick-release cymbal felt locating device of the present invention in a second manner.
Figure 5:
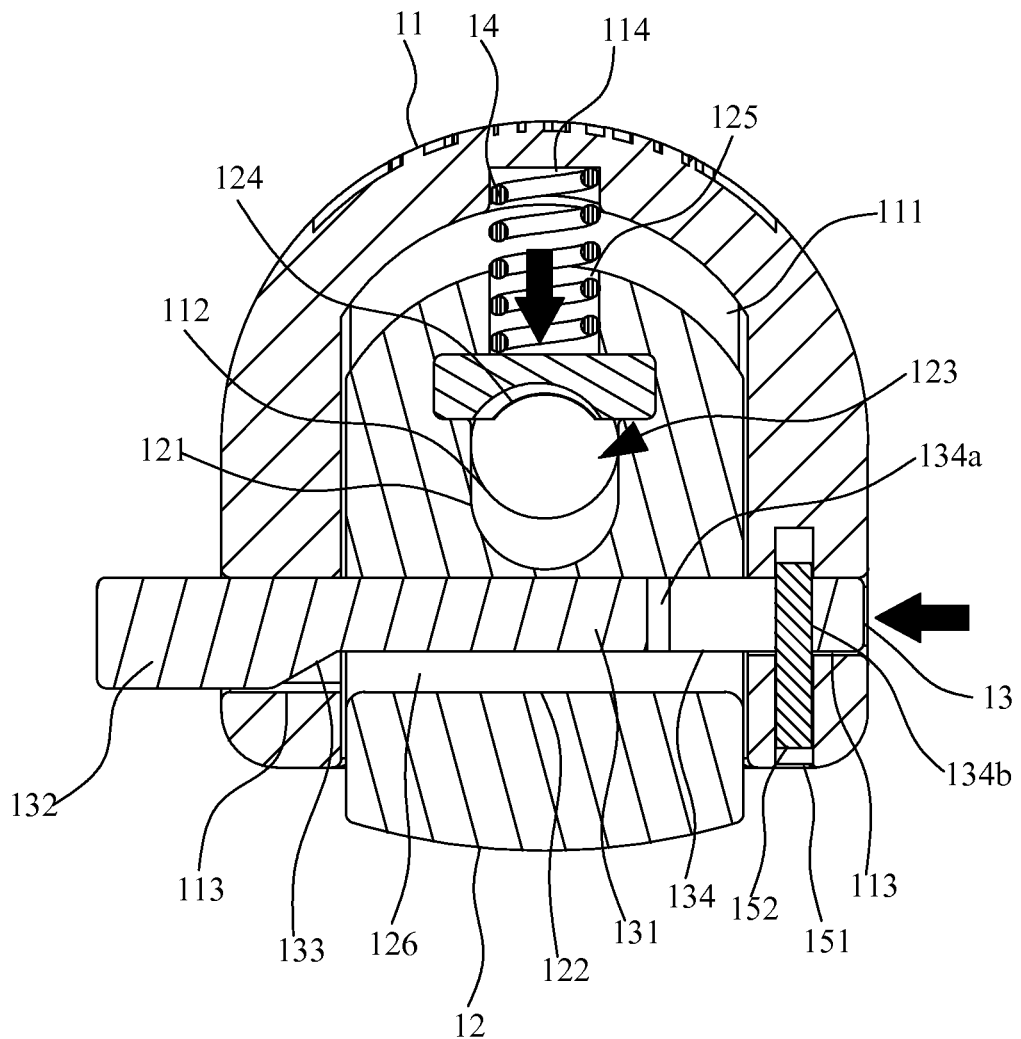
FIG. 5 is a top sectional view showing a movable clamping element of the present invention in FIG. 4 is elastically pushed outward by an elastic element to a clamping position.

The safety pin 13 includes a first section 131 and a second section 132 that are different in thickness. When the safety pin 13 is inserted into the second insert hole 113 and the second communicating hole 122 with only the first section 131 being located in the second communicating hole 122 as shown in FIGS. 4 and 5, there would be a margin space 126 left in the second communicating hole 122 between the safety pin 13 and the movable clamping element 12, allowing the movable clamping element 12 to displace inward or outward relative to the safety pin 13 and the cavity 111. On the other hand, when the first section 131 and the second section 132 are both located in the second communicating hole 122 as shown in FIG. 3, the movable clamping element 12 is fixedly held in the cavity 111 by the safety pin 13. In the illustrated embodiment, the second insert hole 113 has two opposite ends separately sized corresponding to the first section 131 and of the second section 132, and the second communicating hole 122 is sized corresponding to the second section 132. A slope section 133 is further provided on the safety pin 13 between the first section 131 and the second section 132, allowing the movable clamping element 12 to conveniently slide from the first section 131 to the second section 132 via the slope section 133 when the safety pin 13 is displaced in the second insert hole 113 and the second communicating hole 122.

The quick-release cymbal felt locating device 10 further includes a stop mechanism 15 provided between the base 11 and the safety pin 13 for limiting a range within which the safety pin 13 can be transversely displaced. The stop mechanism 15 includes a fixing hole 151 formed on the base 11 and a long sliding slot 134 formed on the safety pin 13. The sliding slot 134 internally defines a first limiting end 134a and an opposite second limiting end 134b. And, a stop pin 152 is extended into the fixing hole 151 and the sliding slot 134.

Please refer to FIG. 3 that shows the quick-release cymbal felt locating device 10 is in use and both of the first section 131 and the second section 132 of the safety pin 13 are located in the second communicating hole 122. Since the second section 132 and the second communicating hole 122 are the same in size, the movable clamping element 12 is now immovable held in the cavity 111 by the second section 132 while the inner wall surface of the first insert hole 112 and the opposite inner wall surface of the first communicating hole 121 together form a clamping state. Further, as a result of an elastic push force of the elastic element 14, the clamping effect provided by the first communicating hole 121 and the first insert hole 112 is largely enhanced.

Please refer to FIGS. 4 and 5 that show the quick-release cymbal felt locating device 10 is in use but only the first section 131 of the safety pin 13 is located in the second communicating hole 122 of the movable clamping element 12. Since the first section 131 is smaller than the first communicating hole 122 in size, there is a margin space 126 in the first communicating hole 122 between the movable clamping element 12 and the safety pin 13, allowing the movable clamping element 12 to displace inward or outward relative to the safety pin 13 and the cavity 111. When a user externally applies a force to push the movable clamping element 12 inward, as shown in FIG. 4, the elastic element 14 is compressed and the first communicating hole 121 together with the first insert hole 112 forms a release state. On the other hand, when the user stops applying the push force against the movable clamping element 12, the movable clamping element 12 automatically moves outward to press against the safety pin 13 under an elastic restoring force of the elastic element 14.

Figure 6:
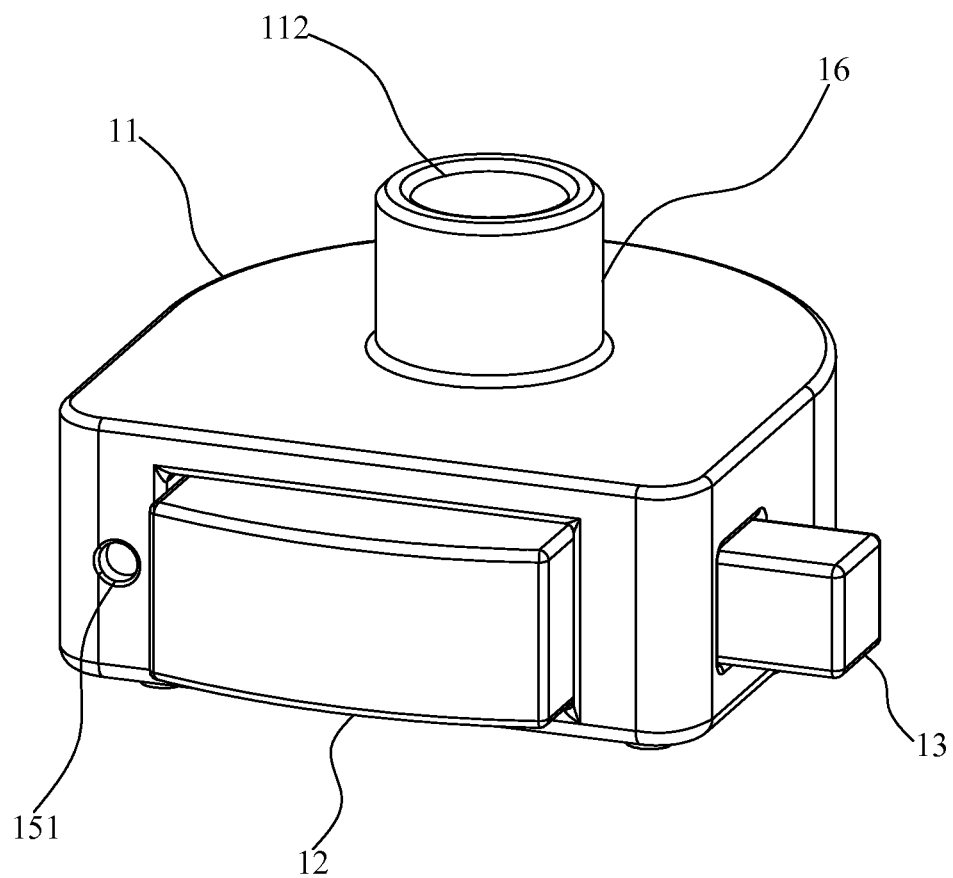
FIG. 6 is a bottom perspective view of the quick-release cymbal felt locating device of FIG. 1.
Figure 8:
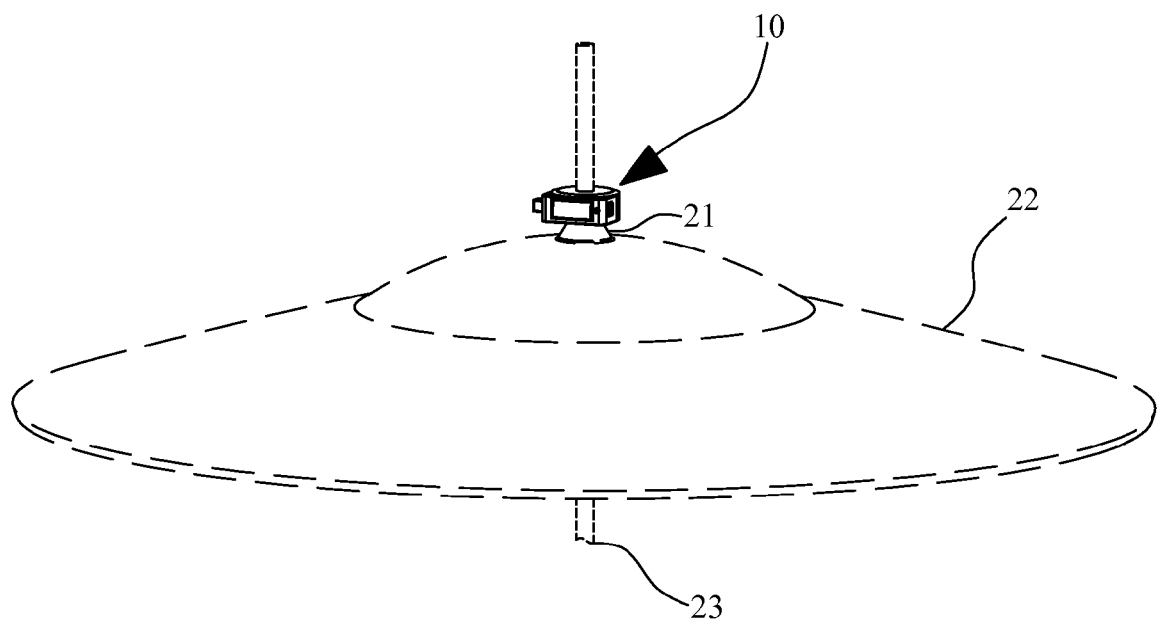
FIG. 8 is an assembled view of FIG. 7 showing the cymbal felt and the cymbal have been connected to the cymbal pole.

FIG. 6 is a bottom perspective view of the quick-release cymbal felt locating device 10. Please refer to FIG. 6 along with FIGS. 7 and 8. A coupler 16 is formed around and downward projected from an end of the first insert hole 112 on a bottom side of the base 11 for a piece of cymbal felt 21 to fit therearound. To use the quick-release cymbal felt locating device 10, simply fit the cymbal felt 21 around the coupler 16 and extend the cymbal pole 23 through a cymbal 22, the cymbal felt 21, and the first insert and communicating holes 112, 121 on the base 11 to quickly complete assembling of the quick-release cymbal felt locating device 10 to the cymbal pole 23, as shown in FIG. 8.

In brief, by using the first communicating hole and the first insert hole to together provide a clamping function, the user may quickly assemble or disassemble the quick-release cymbal felt locating device to or from the cymbal pole. Moreover, with the safety pin and the elastic element provided between the base and the movable clamping element, it is able to ensure firm and stable connection of the quick-release cymbal felt locating device of the present invention to the cymbal pole.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A quick-release cymbal felt locating device for quickly assembling to or disassembling from a cymbal pole, comprising:
   a base internally defining a cavity having a front opening; the base being provided with a first insert hole vertically extended through the base via the cavity, and a second insert hole horizontally extended through the base via the cavity;
   a movable clamping element extending into the cavity via the front opening thereof; the movable clamping element being provided with a first communicating hole corresponding to the first insert hole, and a second communicating hole corresponding to the second insert hole; such that the first communicating hole cooperates with the first insert hole to clamp the cymbal pole therebetween; and
   a safety pin being transversely extended through the second insert hole and the second communicating hole for restricting or allowing displacement of the movable clamping element relative to the safety pin and the cavity.

2. The quick-release cymbal felt locating device as claimed in claim 1, wherein the first insert hole has an inner wall surface cooperating with an opposite inner wall surface of the first communicating hole to form a clamping mechanism.

3. The quick-release cymbal felt locating device as claimed in claim 1, further comprising an elastic element axially disposed between the base and the movable clamping element for automatically elastically pushing the movable clamping element outward to press against the safety pin when the movable clamping element is not subjected to an inward push force externally applied thereto.

4. The quick-release cymbal felt locating device as claimed in claim 1, wherein the safety pin includes a first section and a second section that are different in thickness; whereby when the safety pin is inserted into the second insert hole and the second communicating hole with only the first section located in the second communicating hole, there is a margin space in the second communicating hole between the safety pin and the movable clamping element, allowing the movable clamping element to displace inward or outward relative to the safety pin and the cavity; and when the first section and the second section are both located in the second communicating hole, the movable clamping element is locked relative to the cavity.

5. The quick-release cymbal felt locating device as claimed in claim 4, wherein the second insert hole has two opposite ends being separately sized corresponding to the first section and the second section; and the second communicating hole is sized corresponding to the second section.

6. The quick-release cymbal felt locating device as claimed in claim 4, wherein the safety pin further includes a slope section located between the first section and the second section, allowing the movable clamping element to conveniently slide from the first section to the second section via the slope section when the safety pin is displaced in the second insert hole and the second communicating hole.

7. The quick-release cymbal felt locating device as claimed in claim 1, further comprising a stop mechanism provided between the base and the safety pin for limiting a range within which the safety pin can be transversely displaced.

8. The quick-release cymbal felt locating device as claimed in claim 7, wherein the stop mechanism includes a fixing hole formed on the base, a long sliding slot formed on the safety pin, and a stop pin; the sliding slot internally defining a first limiting end and an opposite second limiting end; and the stop pin being extended into the fixing hole and the sliding slot.

9. The quick-release cymbal felt locating device as claimed in claim 1, further comprising a coupler formed around and downward projected from an end of the first insert hole on a bottom side of the base for a piece of cymbal felt to fit therearound.

10. The quick-release cymbal felt locating device as claimed in claim 1, wherein the first communicating hole is provided on a part of an inner wall surface thereof with internal threads.

* * * * *